INVENTOR:
WILLEM RIBBELINK
BY
Breitenfeld & Levine
ATTORNEYS

INVENTOR:
WILLEM RIBBELINK
BY
Breitenfeld & Levine
ATTORNEYS

INVENTOR:
WILLEM RIBBELINK
BY Breitenfeld & Levine
ATTORNEYS

INVENTOR:
WILLEM RIBBELINK
BY Breitenfeld & Levine
ATTORNEYS

INVENTOR:
WILLEM RIBBELINK
BY Breitenfeld & Levine
ATTORNEYS

United States Patent Office 3,353,139
Patented Nov. 14, 1967

3,353,139
PANEL PROVIDED WITH A NUMBER OF SOCKET CONTACTS WHICH ARE ARRANGED IN A DEFINITE PATTERN

Willem Ribbelink, The Hague, Netherlands
Filed Oct. 11, 1965, Ser. No. 494,842
Claims priority, application Netherlands, Oct. 12, 1964, 64—11,830
7 Claims. (Cl. 339—18)

ABSTRACT OF THE DISCLOSURE

Pattern comprises horizontal and vertical rows of groups of four sockets each arranged in a diamond pattern, a group of six sockets arranged in a rectangular pattern between each two adjacent diamond pattern groups in either a horizontal or vertical direction. The horizontal and vertical distances between the two closest sockets of adjacent diamond pattern groups are equal to each other and to the distance from one of the diamond pattern sockets to certain sockets of the adjacent rectangular pattern groups.

Electrical components carry at least two contact pins to fit the sockets, the pins being spaced apart so as to fit at least two sockets simultaneously.

My invention relates to a panel which is provided with a number of socket contacts arranged according to a definite pattern and serving to receive the contact pins of electrical switch components, said mutually interconnected socket contacts being situated on the angular points of a diamond so as to form groups of four, the centres of these diamonds being situated on the points of intersection of equidistantly spaced straight lines, the latter extending according to two mutually perpendicular coordinates.

Such a panel is commonly known. In this known panel electronic circuits can be rapidly built up by means of electrical or electronic components, provided with contact pins, interconnecting pins and cords without the need to solder connections.

In this known system for various circuits differently constructed panels are used, the location of socket contacts being different in each panel and adapted to the relative circuit, the greater part of the necessary interconnections between the socket contacts being already made. This means that a great number of different panels should be purchased each of which can only be used to a limited extent. This known panel can therefore only be used for simple circuits.

My invention aims to provide a panel which is provided with socket contacts which are mounted in such a configuration that various complicated circuits can be realized by means thereof, while nevertheless the required interconnection between the components remain as short as possible, so as to allow for circuits operating at high frequencies, an optimum use of the available surface being made, whereby this system is especially suitable for use in laboratories.

It is an object of my invention to provide a panel in which groups of socket contacts are placed in the direction of at least the first coordinate between adjoining diamonds, the contacts being placed on the corners and the sides respectively of a square, so that the groups are composed of at least two rows of three, aligned, mutually interconnected socket contacts, each group being symmetrical in respect of both the connecting line of the centres of the diamonds concerned and the line, which on equal distance from these centres, is perpendicular to the aforementioned coordinate.

A further object of my invention is to provide a panel in which the shortest distance A between two angular points, situated on the first coordinate, of two different, adjacent, diamonds is equal to the shortest distance A between two angular points, situated on the second coordinate, of two different, adjacent, diamonds, which distance A is furthermore equal to the distance of such an angular point, situated on the second coordinate, to the socket contact most remote therefrom, but situated on the same side of first coordinate, of the rectangular group of socket contacts, situated directly thereabove and therebelow respectively, or to the nearest socket contacts of the rectangular groups of socket contacts, which are in line with these groups and situated beside them.

An electrical or electronic component to be used in an aforementioned panel is preferably provided with two contact pins, the spacing of which is equal to the shortest distance of the angular points, situated on a first coordinate, of two adjacent diamonds.

Another object of my invention is to provide for such a component which is provided with three aligned contact pins, the spacing of the outer contact pins in respect to one the other being equal to the shortest distance between two angular points, directed towards each other, of two adjacent diamonds, the distance between the third contact pin and one of the outer contact pins being equal to the distance between one of the aforementioned angular points and the facing socket contacts of the rectangular group of socket contacts.

It is a still further object of my invention to provide such a component with four contact pins which are situated on the angular points of a rectangle, one side of which has a length which is equal to the distance as denoted by A, while the other side has a length D, which is equal to the distance between the two angular points, situated on the same side of a coordinate, of two adjacent diamonds, which are separated from each other by a rectangular group of socket contacts.

The four contact pins may also be situated on the angular points of an isosceles trapezium, of which the shorter one of the parallel sides has a length which is equal to the shortest distance B between two adjacent socket contacts of two different rectangular groups of socket contacts, the other parallel side having a length which is equal to the distance as denoted by A.

Another object of my invention is to provide for a component which is preferably mounted on a plate of insulating material, which support the contact pins, having screw threaded ends, in such a way that a part of the screw thread protrudes beyond the plate so as to make it possible to screw an oblong socket contact with inner screw thread thereon.

Due to the above features a panel is obtained which has a great many possibilities and in which the length of the interconnections between the various components is limited to a minimum, so that also circuits operating at high frequencies (in the order of magnitude of megacycles per second) can be built with it.

Due to the fact that the threaded ends of the contact pins protrude from the plate it is possible to screw corresponding socket contacts on these projecting ends, which then serve to receive the contact pins of another component, so that in this way two or more components may be connected in parallel without occupying any additional space on the panel itself.

A more complete understanding of my invention, and of further objects and features thereof can be obtained from the following description of illustrative embodiments thereof, when considered in connection with the accompanying drawings, wherein:

FIGURE 1 shows a plan view of a panel according to the invention, illustrating the positioning and spacing of the socket contacts in respect of one another.

FIGURES 2A, 2B, 3A, 3B, 4A, 4B, 5A, 5B, 6, 7, and 8 show examples of electrical components which can be placed on the panel.

Figure 1:
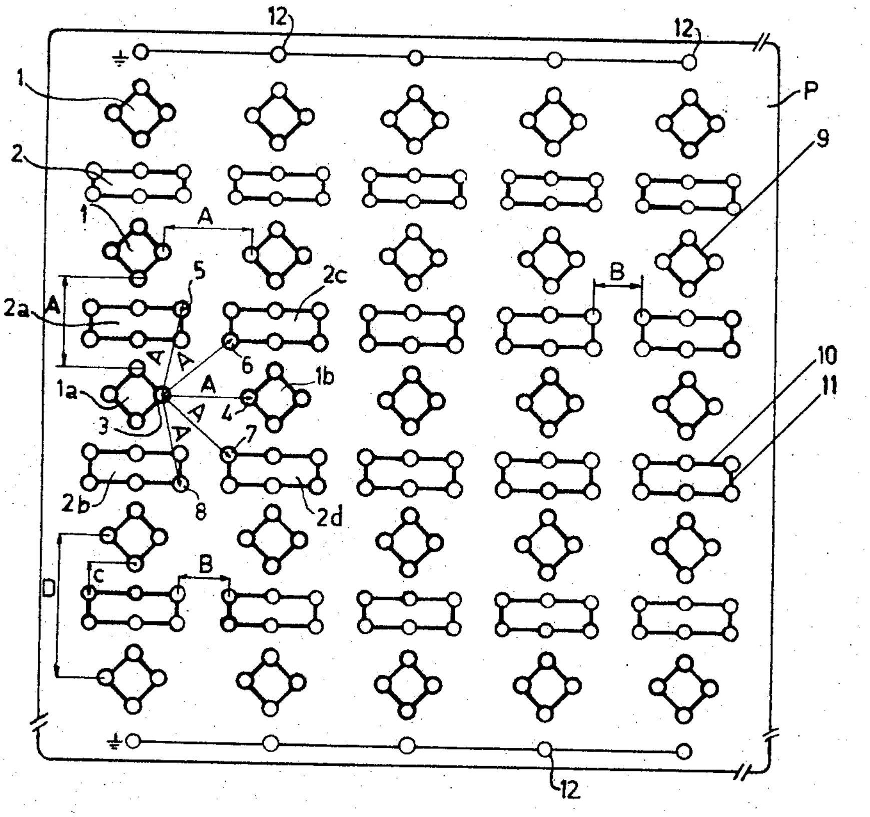

As FIGURE 1 shows the panel, denoted by the character P, is provided with two different groups of interconnected socket contacts. A number of socket contacts are arranged in groups of four so as to be situated on the angular points of a diamond; these diamond-shaped groups are denoted by the numeral 1 in FIGURE 1. A number of socket contacts is positioned in rectangular groups which are denoted by the numeral 2. The rectangular groups consist each of six socket contacts, four of which are situated on the four angular points, and two in the middle of each long side. These socket contacts are interconnected. The diamond-shaped groups are situated in vertical rows beside each other, between two adjacent diamonds 1 of a vertical row lies a rectangular group 2.

According to my invention the distance between the respective groups and the dimensions of the different groups are chosen in a very particular way. In a vertical direction, the distance, indicated by the character A in the drawing of the adjoining angular points of two adjoining diamonds is equal to the distance in horizontal direction between corresponding angular points of adjoining diamonds. The distance, however, is also equal to the distance between such an angular point, situated on a horizontal line through the centre of the diamond, and the most remote socket contacts, as situated on the same side of a vertical line through the said centre, of the directly adjacent rectangular groups, or the nearest socket contacts of the rectangular groups situated beside the first mentioned rectangular groups. For instance the distance of the socket contact 3 in the diamond group 1*a* to the socket contact 4 of the likewise diamond group 1*b*, said distance being denoted by the character A, is equal to the distance of the socket contact 3 to the socket contact 5 of the group 2*a*, socket contact 6 of group 2*b*, and is further equal to the distance to the socket contact 7 of the group 2*d*, and also equal to the distance A to the socket contact 8 of the group 2*b*. It is obvious that the same applies to corresponding points of the other diamond-shaped and rectangular groups. Such a configuration as is described hereinafter is advantageous in that it allows for the positioning of three- and four-polar components in two different ways, whereby the system as such becomes much more flexible.

The socket contacts of the diamonds 1 are interconnected by means of the wires or strips 9 situated under the panel. For the sake of clarity, these wires are shown in full lines in the drawings. The same applies to the socket contacts of the groups 2 which are interconnected by means of the wires and strips 10, 11 respectively. Provided at the upper and lower edge respectively of the panel are socket contacts 12, which are interconnected and which are to be used as earthing contacts.

FIGURES 2A to 8 show different examples of electronic components which are mounted on plates; these plates are provided with contact pins.

Figure 2B:
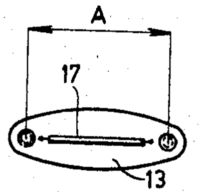
Figure 2A:
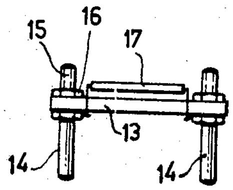

FIGURES 2A and 2B represent a side elevation and plan view respectively of a simple interconnecting element. The plate 13 has two contact pins 14, each with a threaded end 15; by means of a nut 16 are they secured to the plate. The electrical interconnection is denoted by the reference numeral 17.

The spacing of the contact pins 14 may be equal to the distance A indicated hereinbefore, such an interconnection can therefore be used in order to establish a direct connection between the facing angular points of two adjacent diamonds and between an angular point of a diamond and the available socket contacts of the rectangulr groups of socket contacts situated therearound. The distance between the pin contacts 14 may, however, also be equal to the distance between two adjacent rectangular groups 2, which distance is indicated by the character B in FIGURE 1. Finally a third possibility is that the distance between the pin contacts is equal to the distance between an angular point of a diamond and the socket contact of a rectangular group which is situated directly therebelow; in FIG. 1 this distance is denoted by the character C. The groups of socket contacts may thus be interconnected in a different way by means of these three interconnection members.

Figure 3B:
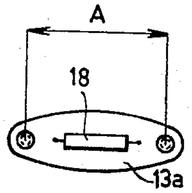
Figure 3A:
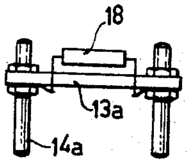

FIGURES 3A and 3B show a component provided with two connecting points, e.g., a resistor 18, mounted on a plate 13*a* which is provided with two contact pins 14*a* in the same way as described above. In this case the spacing of the contact pins is equal to the distance A.

Figure 4B:
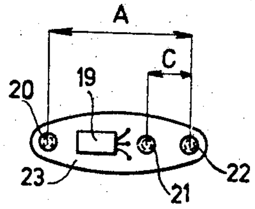
Figure 4A:
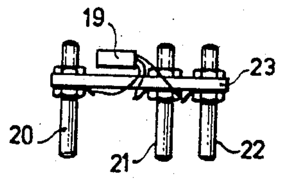

FIGURES 4A and 4B illustrate the mounting and connecting of an electrical component with three connections, e.g., a transistor 19 on a plate 23 provided with three connecting pins 20, 21, 22. The distance between the outer pins 20, 22 respectively is in this case, too, equal to the distance A; the distance between the pin 21 and the outer pin 22 is equal to the distance C.

Figure 5B:
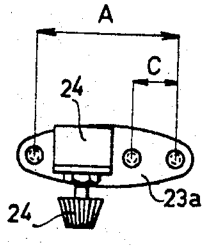
Figure 5A:
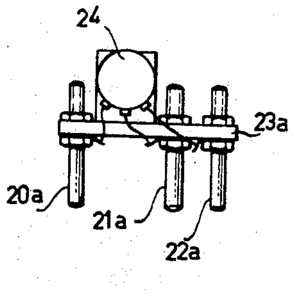

FIGURES 5A and 5B show the mounting of another component with three connections, viz. a potentiometer 24 on a plate 23*a*, provided with three connecting pins. The distance between the contact pins 20*a* and 21*a*, 22*a* and 22 respectively, is equal to the distance described hereinbefore in relation to the pins 20, 21, 22.

Figure 6:
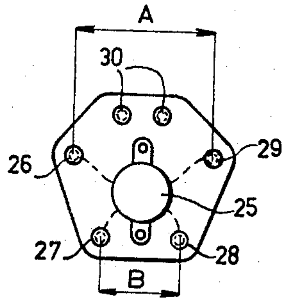

FIGURE 6 shows a plan view of a plate arranged to receive a component provided with four connections. In the case shown this is an electron valve 25, viz. a pentode, the control grid of which is connected with the contact pin 26, the cathode and the third grid being connected with the contact pin 27, the screen grid of which is connected with the contact pin 28 while the anode is connected with the contact pin 29. The filament is connected with the separately, small contacts 30; the filament current is supplied through flexible cords provided with suitable pins. The distance between the pins 26 and 29 is equal to the distance A; the distance between the pins 27 and 28 is equal to the distance B. The effect of this arrangement will be described hereinafter with reference to FIGURE 12.

Figure 7:
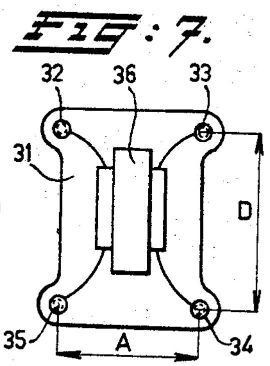

FIGURE 7 shows in plan view a plate 31 with four contact pins 32, 33, 34, 35 situated on the angular points of a rectangle. Connected to the pins 32 and 35 is the primary winding of the transformer 36, the secondary winding of which is connected to the pins 33 and 34. The distance between the contact pins 34 and 35 is again equal to the distance A, the distance between the contact pins 32 and 35 is equal to the distance denoted in FIGURE 1 by the character D.

Figure 8:
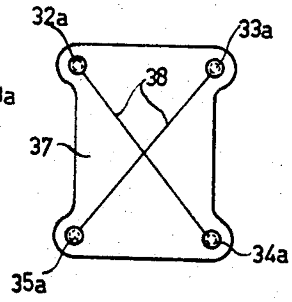

As far as the mutual distance and the number of contact pins is concerned the plate 37 represented in FIGURE 8 satisfies the conditions mentioned hereinbefore; in this case, however, the contact pins are crosswise interconnected by means of the leads 38.

Figure 9:
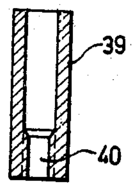
FIGURE 9 shows a cross section of a lengthening socket.

As is described hereinbefore the contact pins are secured to the plates in such a way that a part of the threaded end protrudes therefrom. On this free end the threaded socket contact 39, shown in section in FIGURE 9, can be screwed, the lower part 40 thereof, which is provided with internal screw thread, being screwed on the protruding, a threaded part of the contact pin.

Figure 10:
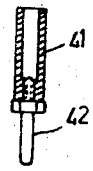
FIGURE 10 shows a cross section of a loose contact pin provided with a lengthening socket.

FIGURE 10 shows how a threaded contact socket 41 may be directly screwed on a single contact pin 42.

Figure 11:
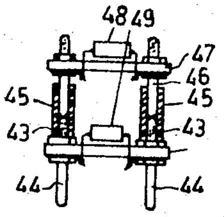
FIGURE 11 shows the way in which two components are connected in parallel.

FIGURE 11 illustrates how, by means of threaded contact sockets, two electrical components can be connected in parallel. The threaded contact socket 45 is screwed on the protruding part 43 of the contact pin 44; the components 48 and 49 are connected in parallel by inserting the contact pins 46 of another plate 47 provided with an electronic component.

Figure 12:
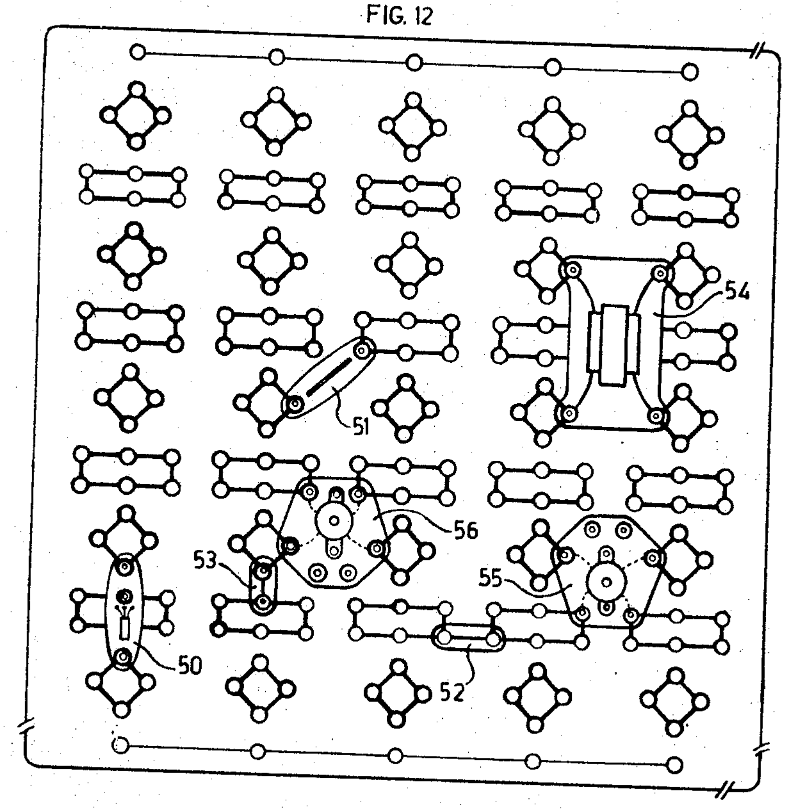
FIGURE 12 represents a plan view of a plate provided with electrical circuit components.

FIGURE 12 shows a plan view of a panel provided with some electrical components. It is obvious that these components are positioned in a random way and this figure does not represent any definite electronic circuits. The figure shows a component provided with three connections, e.g. a transistor 50, three interconnecting elements 51, 52, 53 respectively, with different lengths, a component with four connections, e.g. a transistor 54 and two components 55, 56 respectively, with four connections, e.g. electronic valves. It should be noted that the components of the latter type 55, 56, respectively can be placed in two different positions which are rotated through 180° in respect to each other; the same applies to the component 50 provided with three pins. As a result it is possible to build in a very clarifying way and with the shortest possible interconnections circuits of a type with cross connections between the input and output electrodes of amplifying components, such as multivibrators, trigger circuits and the like.

Figure 13:
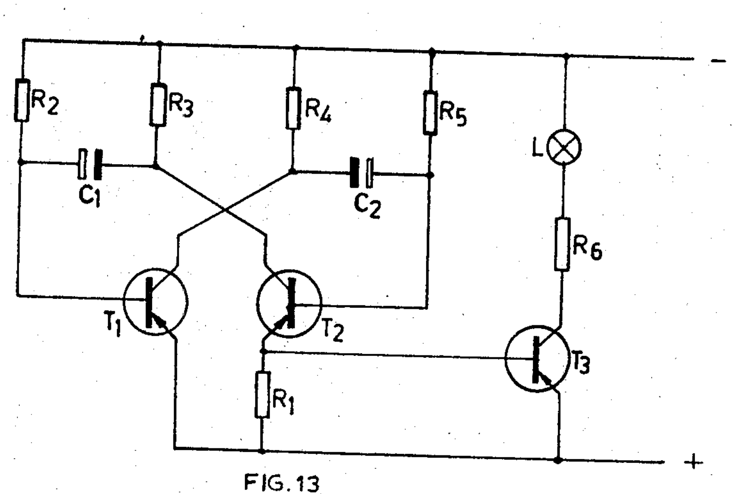
FIGURE 13 shows the circuit diagram of a transistorized astable multivibrator circuit.

FIGURE 13 shows the circuit diagram of a multivibrator of which the state is indicated by means of an indicator lamp.

Figure 14:
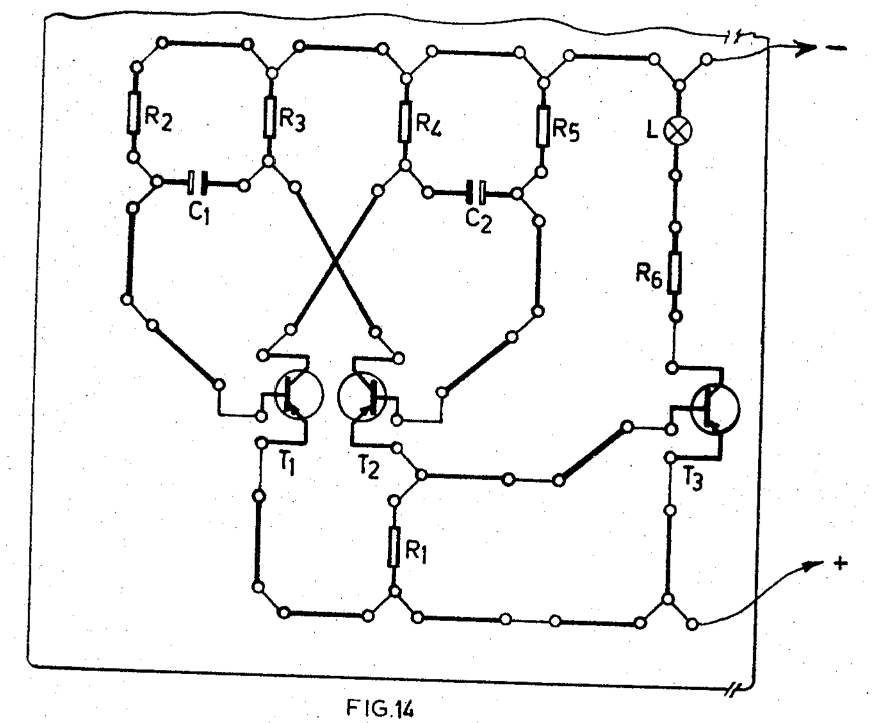
FIGURE 14 shows how this circuit can be built with the aid of a panel according to the invention.
Figure 15:
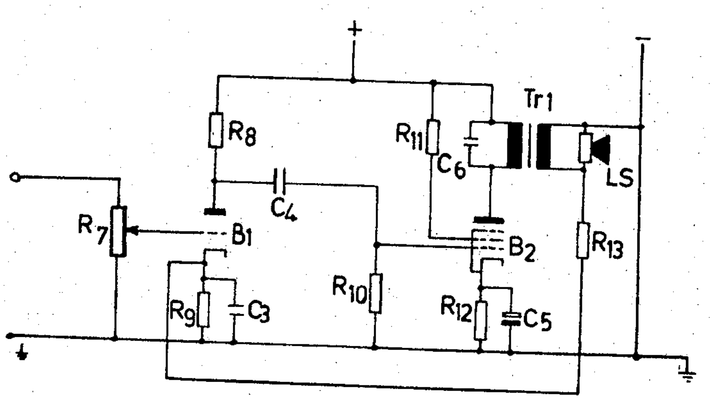
FIGURE 15 shows the circuit diagram of a LF-amplifier equipped with valves.

FIGURE 14 shows how such a circuit can be built on the panel according to the invention. The thin lines represent the interconnections already provided in the panel; the thick lines represent the connections realized by means of interconnecting pins. The same applies to FIGURE 16 which shows how the circuit, shown in FIGURE 15—a conventional feed-back low frequency amplifier—is built on the panel. In this circuit it should be noted that in FIGURE 16 the symbol denoted by 57 is understood to represent the parallel circuit of a condenser and a resistor, realized in the way as represented in FIGURE 11.

Figure 16:
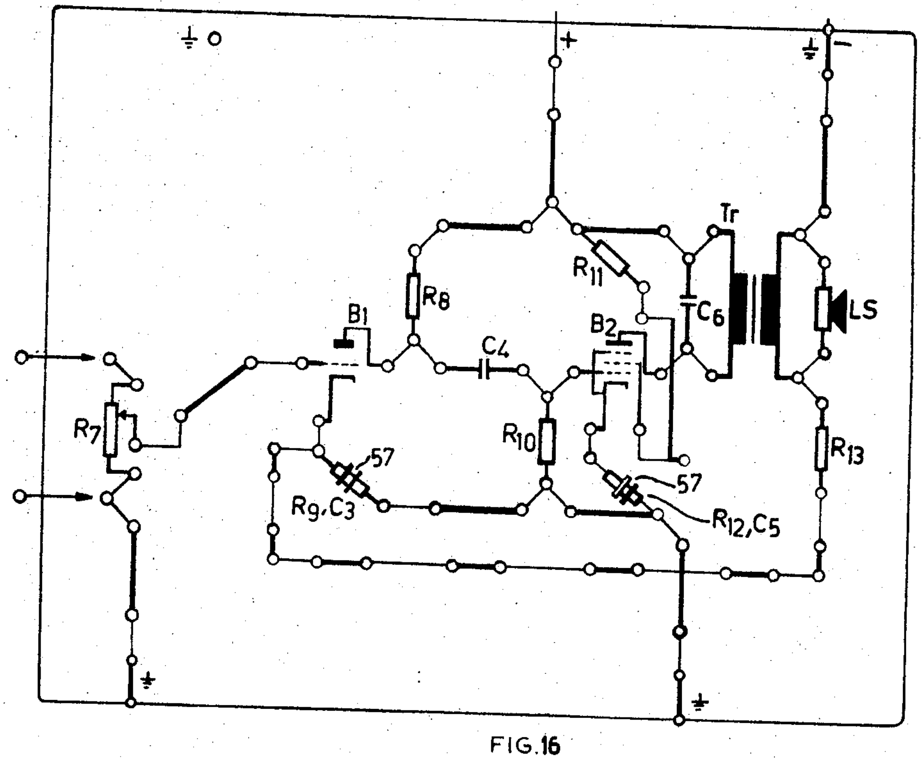
FIGURE 16 shows how such a circuit can be built by means of a panel according to the invention.

For the sake of clarity the FIGURES 14 and 16 represent only the contact sockets used to build the circuit. It is evident that it is now possible to provide a flat plate with apertures at the exact locations which correspond with the contact sockets to be used and in which also, as shown in the FIGURES 14 and 16, the components and interconnections to be used are indicated by their usual symbols. In this way it is possible, when the panel is used for educational purposes, to proceed in an early stage to the construction of complete electronic circuits.

Having thus described my invention, what is claimed as new and desired to be secured by Letters Patent is:

1. Panel, provided with a number of contact sockets arranged in a definite pattern and serving to receive the contact pins of electrical or electronic components, comprising groups of four interconnected contact sockets placed on the angular points of a diamond while the centres of these diamonds lie on the intersecting points of equidistantly spaced, mutually perpendicular coordinate lines, characterized in that in the direction of the first coordinate between adjoining diamond-shaped groups, groups of contact sockets are provided, said sockets being oriented along the sides of a rectangle, the said groups thereby comprising at least two rows of three, aligned, mutually interconnected, contact sockets, while each group is symmetrical in respect of both the connecting line of the centres of the diamonds concerned and a line, equidistantly spaced from these centres and being perpendicular to said coordinate.

2. Panel according to claim 1, characterized in that for each pair of adjoining diamonds the shortest distance A between two angular points, situated on the first coordinate, is equal to the shortest distance A between two angular points of diamonds situated on the second coordinate, said distance A being furthermore equal to the distance of such an angular point, situated on the second coordinate, to the contact socket most remote therefrom, but situated on the same side of the first coordintae of the rectangular group of contact sockets situated directly thereabove or therebelow respectively, or to the nearest contact socket of the rectangular group of contact sockets which lies in line with these groups and are situated beside them.

3. Electrical or electronic component in combination with a panel according to claim 2, characterized by two contact pins the spacing of which being equal to the distance as denoted by the character A.

4. Electrical or electronic component in combination with a panel according to claim 1, characterized by three aligned contact pins, the spacing of the outer contact pins being equal to the shortest distance between the two angular points, directed towards each other, of two adjacent diamonds, the distance between the third contact pin and one of the outer contact pins being equal to the distance C between one of the aforementioned angular points and the facing contact socket of the rectangular group of contact sockets.

5. Electrical or electronic component in combination with a panel according to claim 2, characterized by four contact pins, which are situated on the angular points of a rectangle, one side of which has a length which is equal to the distance as denoted by A, while the other side has a length D which is equal to the distance between the two angular points, situated on the same side of a coordinate of two adjacent diamonds, which are separated by a rectangular group of contact sockets.

6. Electrical or electronic component in combination with a panel according to claim 2, characterized in that it comprises four contact pins which are situated on the angular points of an isosceles trapezium, of which the shorter one of the parallel sides has a length which is equal to the shortest distance B between two adjacent contact sockets of two different rectangular groups B of contact sockets, the other parallel side having a length which is equal to the distance as indicated by A.

7. Electrical or electronic component in combination with a panel according to claim 1, characterized in that the component is mounted on a plate of insulating material, through which also extend the threaded ends of contact pins in such a way that a part of the screw thread protrudes beyond the plate so as to make it possible to screw thereon a contact socket with inner screw thread.

References Cited

UNITED STATES PATENTS

| | | | |
|---|---|---|---|
| 2,390,706 | 12/1945 | Hearon | 35—19 |
| 2,568,535 | 9/1951 | Ballard | 339—17 |
| 2,885,602 | 5/1959 | Emerson et al. | 339—18 |
| 3,190,975 | 6/1965 | King | 339—18 |
| 3,205,407 | 9/1965 | Thompson | 339—18 |

MARVIN A. CHAMPION, *Primary Examiner.*

PATRICK A. CLIFFORD, *Examiner.*